United States Patent
Rhoads et al.

(10) Patent No.: US 6,643,905 B2
(45) Date of Patent: Nov. 11, 2003

(54) METHOD AND APPARATUS FOR MOUNTING A VEHICLE DOOR

(75) Inventors: Scott Rhoads, Moore, SC (US); Martin Schmitt, Bogen (DE); Olaf Höglinger, Riemerling (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/910,006

(22) Filed: Jul. 23, 2001

(65) Prior Publication Data
US 2002/0023334 A1 Feb. 28, 2002

Related U.S. Application Data

(63) Continuation of application No. PCT/EP99/09013, filed on Nov. 23, 1999.

(51) Int. Cl.⁷ ................................................ B25B 11/02
(52) U.S. Cl. ................... 29/407.09; 29/407.1; 29/464; 29/466; 29/525.01; 29/787; 29/281.5; 269/50; 269/51; 269/58; 269/905
(58) Field of Search .......................... 29/897.2, 407.09, 29/407.1, 434, 464, 466, 468, 525.01, 525.02, 525.11, 783, 787, 795, 281.1, 281.4, 281.5, 11, 771, 791; 33/600, 608, 613, 645; 269/9, 47.5, 51.58, 71.77, 309.905

(56) References Cited

U.S. PATENT DOCUMENTS 4,589,184 A * 5/1986 Asano et al. .................. 29/714
4,961,257 A * 10/1990 Sakamoto et al. ............. 29/823
5,123,148 A * 6/1992 Ikeda et al. ..................... 29/11
5,150,506 A * 9/1992 Kotake et al. ................. 29/434
5,181,307 A * 1/1993 Kitahama et al. ............. 29/434
5,203,811 A * 4/1993 Hirotani et al. ............... 29/434

FOREIGN PATENT DOCUMENTS

| DE | 3342570 | | 7/1985 | | |
|----|---------|---|--------|---|---|
| DE | 3443312 | | 1/1986 | | |
| DE | 9004280 | | 10/1990 | | |
| DE | 4120555 | | 4/1993 | | |
| DE | 4419170 | | 12/1995 | | |
| DE | 19734157 | | 2/1999 | | |
| EP | 0147530 | | 7/1985 | | |
| EP | 0470939 | A1 * | 12/1992 | | |
| EP | 0685622 | | 12/1995 | | |
| EP | 0685622 | A1 * | 12/1995 | | |
| JP | 362216876 | A1 * | 9/1987 | | |
| JP | 363022778 | A1 * | 1/1988 | | |
| JP | 403193576 | A1 * | 8/1991 | ................. | 29/771 |
| JP | 403239685 | A1 * | 10/1991 | ................. | 29/434 |
| JP | 07108965 | | 4/1995 | | |
| JP | 07257450 | | 10/1995 | | |

* cited by examiner

Primary Examiner—Gregory Vidovich
Assistant Examiner—Jermie E. Cozart
(74) Attorney, Agent, or Firm—Crowell & Moring LLP

(57) ABSTRACT

In order to fit side doors precisely on a motor vehicle, this is performed mechanically by aligning an assembly frame on the side frame of the vehicle. This assembly frame has points for receiving supports in which the doors are held. These receiving points are configured such that they permit the alignment of the doors in directions X, Y and Z.

23 Claims, 12 Drawing Sheets

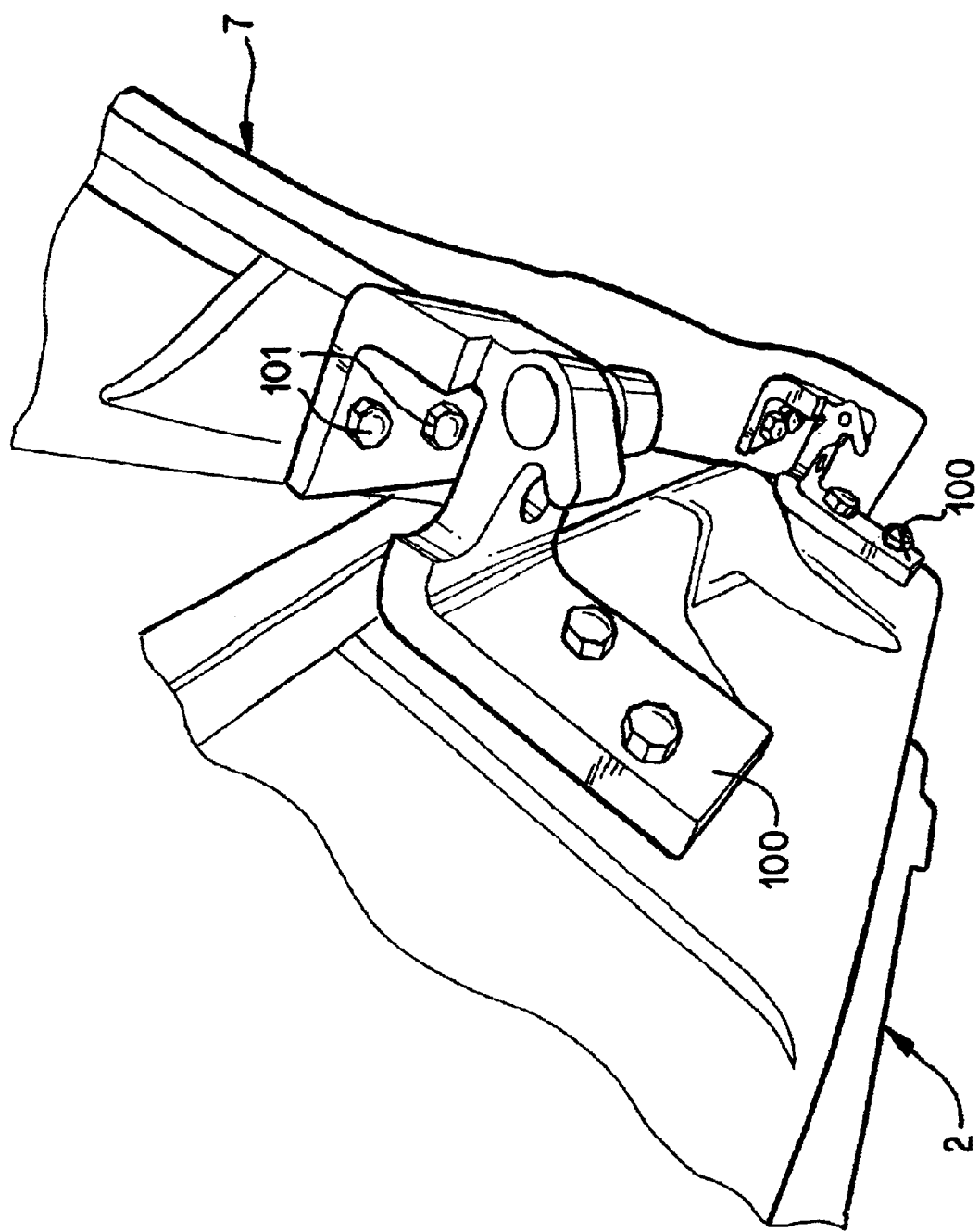

METHOD AND APPARATUS FOR MOUNTING A VEHICLE DOOR

CROSS-REFERENCE TO RELATED APPLICATIONS

This application is a continuation of PCT Application No. PCT/EP99/09013 filed on Nov. 23, 1999.

BACKGROUND AND SUMMARY OF THE INVENTION

This application claims the priority of German Application No. 199 02 635.1, filed in Germany on Jan. 23, 1999, and PCT Application No. PCT/EP99/09013, filed on Nov. 23, 1999, the disclosure of which is expressly incorporated by reference herein.

The invention relates to a method according to the preamble of the first claim and an apparatus for the practice of the method according to the preamble of the fourth claim.

In the assembly of motor vehicles, a number of methods are known for fitting the side doors as accurately as possible with little need for readjustment operations.

In the present case, only those methods are of interest which deal with vehicle doors that are bolted on. In this case it is required that the surfaces of the hinges that are fitted to mating surfaces on the vehicle body be flat against one another without gaps. If hinges are to be welded on, this is unnecessary, and gaps can be present between the hinges and the contact surfaces on the vehicle body. Such gaps are caused by tolerances between the body and the door. The strength of the welds makes these gaps, up to a certain width, tolerable.

A method for bolting a vehicle door to a vehicle body is disclosed in DE 33 42 570 C. Here the prepared door is fitted by an industrial robot into a corresponding door opening. The fitting is performed by sensing fingers and gauges by means of a computer which determines the position of the door. Also, a special three-part hinge must be used in order then to be able to bolt in place the precisely aligned door.

Methods using sensing heads and computers, as well as robots, to hold the door while it is being bolted have proven practical only conditionally, since many inaccuracies can occur and very complex computer programs are necessary.

The problem of the present invention is to improve the above-mentioned method and optimize it for use on an assembly line. It is also the problem of the invention to propose a suitable apparatus for the purpose.

As to its procedural aspects the invention is solved by the features of the first claim, and as to the apparatus involved it is solved by the features of the fourth claim.

The solution is based on the knowledge that the alignment of the vehicle door is performed mechanically, without the need for a computer or industrial robot to fit the door in place. A robot can be used only to transport the door from where it is prepared to the door frame. But the robot does not have the need to align the door and then also hold it in place.

With the bolting procedure proposed by the invention the alignment of the door in the door opening can be achieved with simple means, the method being applicable preferably to a vehicle body with at least four doors, since it can be assured by the method of the invention that both doors are flush with one side of the vehicle. This flush fitting is achieved according to claim 3 by using the same alignment points for the front and rear door of one side of the car in the area of the B post.

The solution according to claim 4 has the advantage that it is accomplished with purely mechanical components for aligning and holding the door in position in the door opening.

Subordinate claims 5 to 14 describe preferred embodiments of the apparatus of claim 4, stressing that both the door frame on the car body and the individual beams for the car doors can be aligned free of tensions. Care has been taken to see that three docking points establish the mounting frame and the individual beams on the width of the car (direction Y), two docking points on the height of the car (direction Z) and one point on the length of the car (direction X).

Another advantage of the invention is to be seen in the fact that ordinary screw-mounting hinges can be used as long as it is assured that the mating surfaces and thus the leaves of the hinges are approximately perpendicular to one another when the door is closed. The bolting itself can then be performed manually or by bolting robots. This, however, is familiar and therefore is not further described.

The invention is described below in conjunction with a preferred embodiment.

BRIEF DESCRIPTION OF THE DRAWINGS

FIG. 12 is a perspective view of the hinges after mounting.

Other objects, advantages and novel features of the present invention will become apparent from the following detailed description of the invention when considered in conjunction with the accompanying drawings.

DETAILED DESCRIPTION OF THE DRAWINGS

Figure 1:
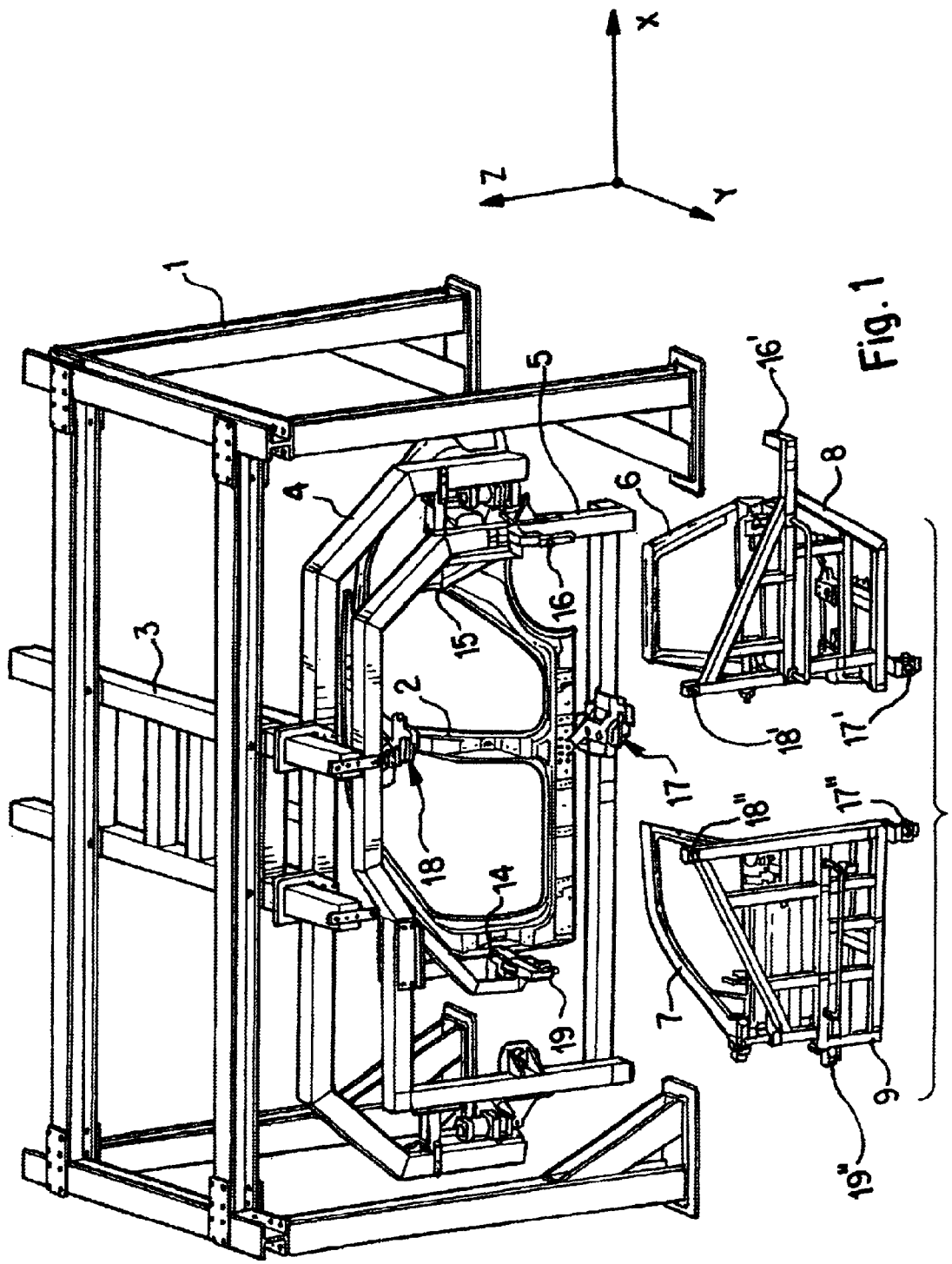
FIG. 1 is a perspective front elevation of the door mounting apparatus of the invention.

The apparatus in FIG. 1 includes a frame 1 which spans tunnel-wise a floor conveyor system, not further indicated, on which a body of an at least four-door automobile is transported. The side view of such a car is represented schematically and identified at 2.

The frame 1 is surmounted by a carrier unit 3 running on rails transversely across the direction of movement of the car, and on it a C-shaped bracket 4 is carried, in which an assembly frame 5 is adjustably and floatingly mounted.

The C-shaped bracket 4 with the assembly frame 5 is mounted on both sides of the car body, at such a distance from it (in the rest position) that a car body can be moved easily between the two brackets 4. For the sake of simplicity only the C-shaped bracket 4 with assembly frame 5 for the left side of the car is represented in FIG. 1. The arrangement for the right side of the car is in a mirror-image relationship thereto, and operates exactly the same as the door mounting apparatus for the left side.

The doors to be mounted, namely the rear door 6 and the front door 7, are prepared in similar supports 8 and 9 outside of the assembly station. The prepared doors are provided with screw-mounting hinges, not shown, which are bolted in the required position.

To couple the assembly frame 5 to the car body, clamping means 10, 11, 12 and 13, described further below but not appearing in FIG. 1, are provided. These clamping means clamp the assembly frame 5 to the car body 2 when an alignment of the assembly frame 5 with the vehicle body has been made by the positioning systems 14 and 15.

In order to fasten the support 8 to the assembly frame 5 and thus align the door 6 held in support 8 with the car body, the docking systems 16, 17 and 18 are provided which cooperate with corresponding holders 16', 17' and 18' on support 8.

The docking systems 17, 18 and 19 serve to fasten the front door 7, which is held in the support 9, to the car body. These docking systems cooperate with the holders 17", 18" and 19" on the support 9.

Before the door mounting is described in detail, the individual components important to the operation will be further explained.

Figure 2:
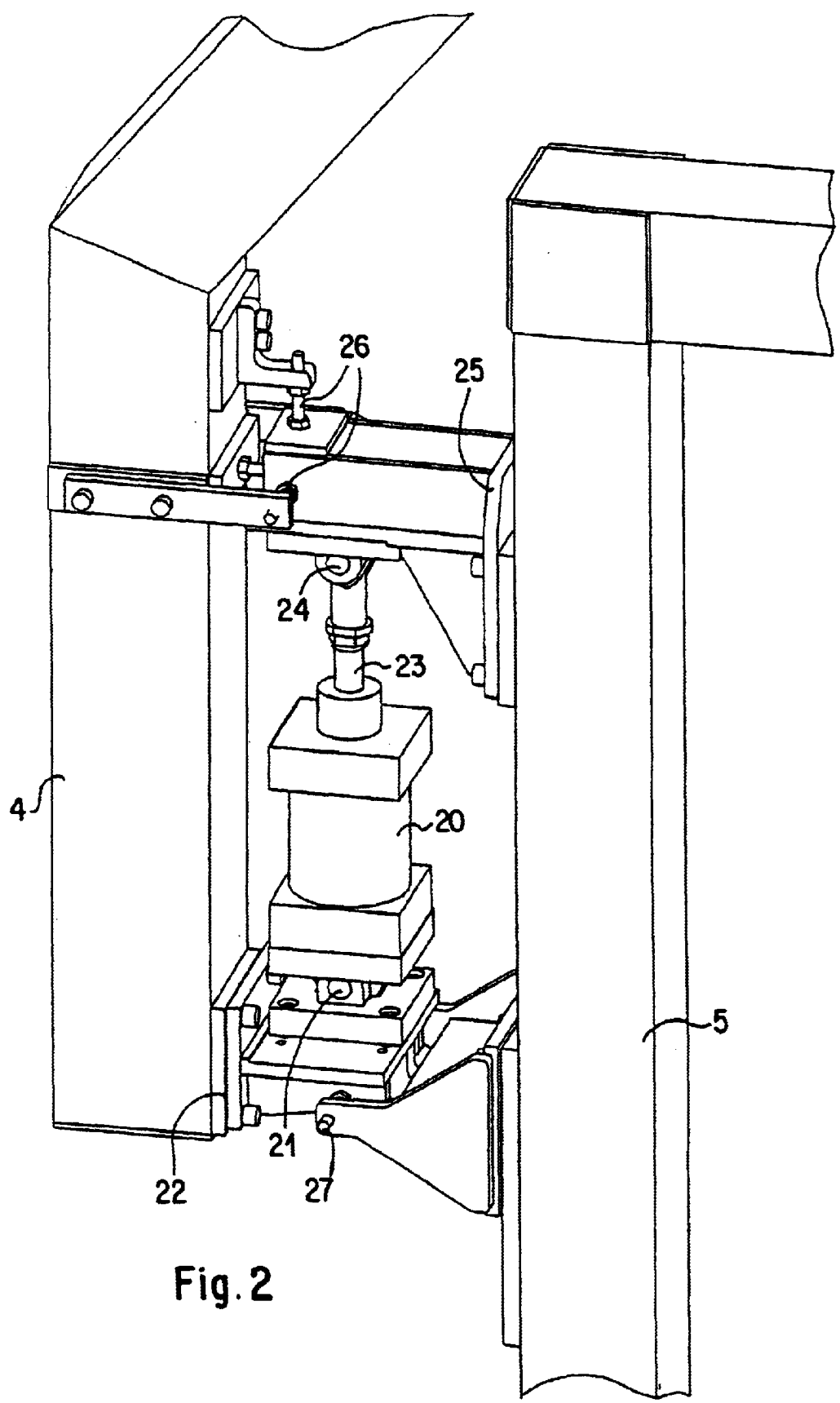
FIG. 2 is a holding device with a floating mount between the C-shaped frame and the mounting frame.

FIG. 2 shows the front (left, in FIG. 1) holding means between the C-shaped bracket 4 and the assembly frame 5. The rear (right, in FIG. 1) holding means between the C-shaped bracket and the assembly frame is of similar construction.

To enable the assembly frame 5 to be aligned with the side frame 2 of the car body, it is mounted for movement in the directions of the length, height and width of the car body.

The holding system includes substantially a cylinder-and-piston unit 20 whose cylinder is fastened by a joint 21 (axis of rotation lying in the direction of the width of the car body (direction Y)) to a flange 22 on the C-shaped bracket 4. The piston rod 23 of the cylinder-and-piston unit is joined by a ball joint 24 to a flange 25 which is affixed to the assembly frame 5.

Abutments 26 and 27 aligned in all three space coordinates make contact with both flange 22 and flange 25, the abutments 27 cooperating with flange 22 being joined to the assembly frame 5 and the abutments 26 cooperating with flange 25 being fastened to the C-shaped bracket 4.

Movability of the assembly frame 5 in directions X and Y is assured by the ball joint 24 and joint 21, while movability in direction Z is assured by the piston rod 23.

Figure 3:
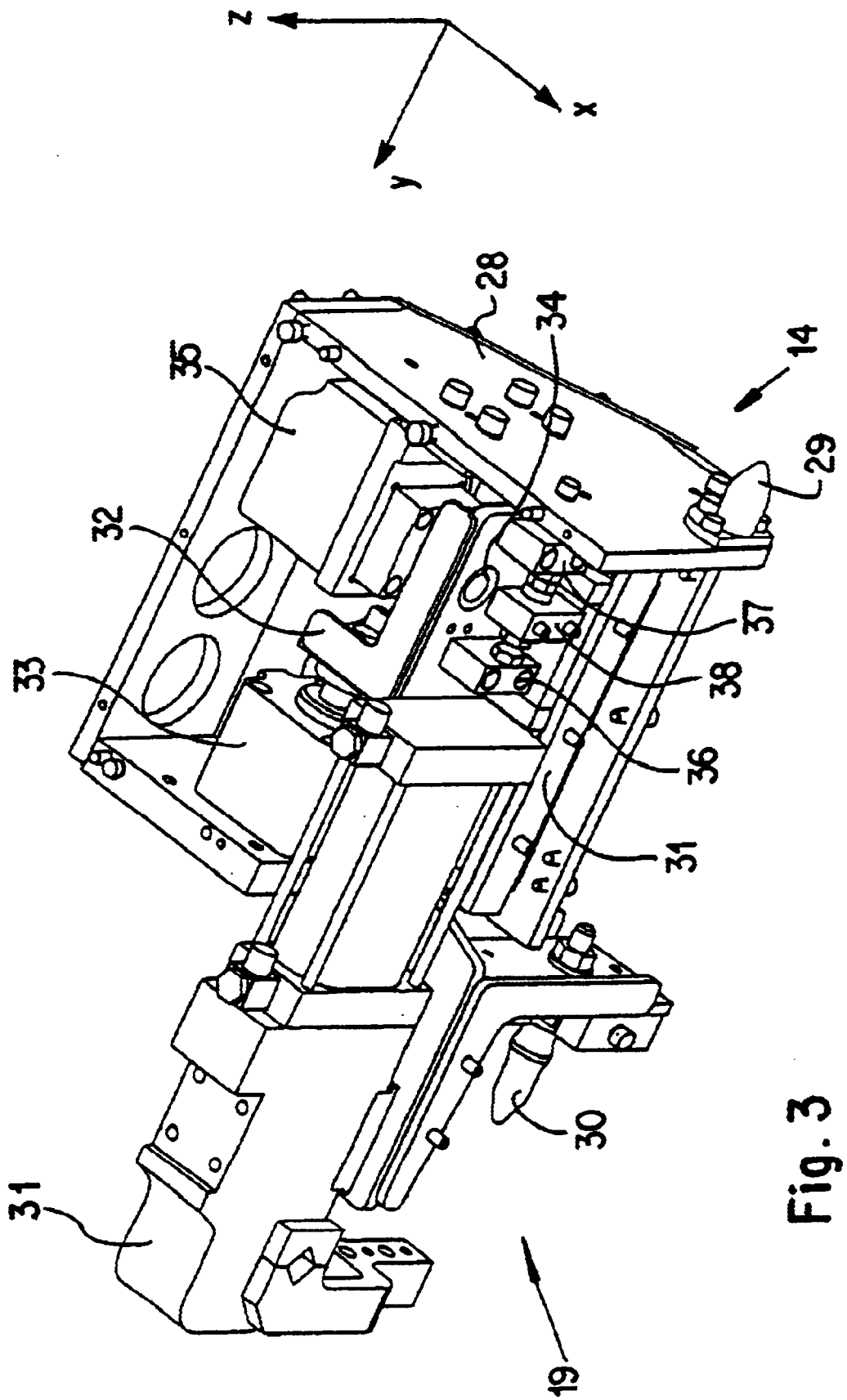
FIG. 3 is a perspective view of the positioning system and the front system for docking to the A frame.

In FIG. 3 the positioning system 14, which is structurally combined in one unit in a housing 28 with the docking point 19, is represented schematically. It is fastened to the assembly frame 5.

The positioning system 14 includes a fixedly disposed stud 29.

The docking point 19 likewise includes a stud 30, which is displaceable in direction Y. For this purpose it is fastened together with a clamping means 31 on a carriage 32 mounted displaceably in the housing 28. For displacement, a pneumatic jack 33 serves, the cylinder of which is fastened to the housing 28 and its piston or piston rod to the carriage 32.

On the carriage 32 there is also a centering socket 34 into which a centering pin, not shown, can be driven by a cylinder 35. The two abutments 36 and 37 on the carriage 32, which cooperate with a counter-abutment 38 fastened to the housing, serve for the easier insertion of the centering pin into the centering socket 34.

Figure 4:
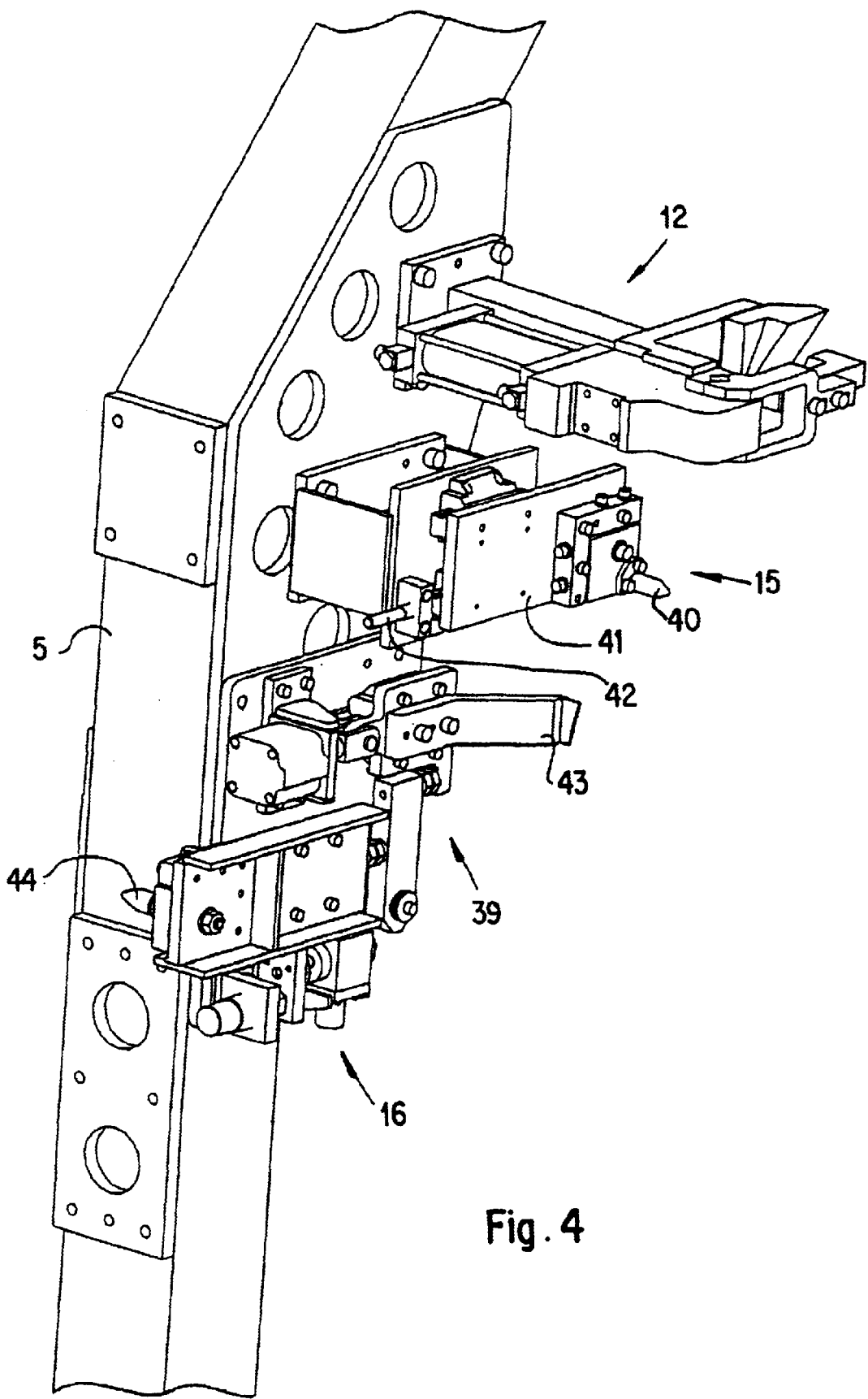
FIG. 4 is a perspective view of the positioning apparatus and rear system for docking to the C post.

In FIG. 4 the clamping system 12 is represented on the one hand, and on the other hand the positioning system 15 as well as the length equalizing system 39. All three units are fastened to the assembly frame 5.

While the clamping system 12 is of conventional design, the positioning system 15 includes a pin 40 which is fastened to a carriage 41 which can move in direction X. It is held by a bracket on the assembly frame 5. An adjustable commercial spring element 42 serves for establishing the null point.

The length equalizing system 39 includes a feeler 43 which is mounted for longitudinal displacement in direction X. It transfers its movement through gearing to another centering pin 44 forming part of the docking point 16. A system providing the same function but of different design is further described in the older DE 197 34 157.8.

Figure 5:
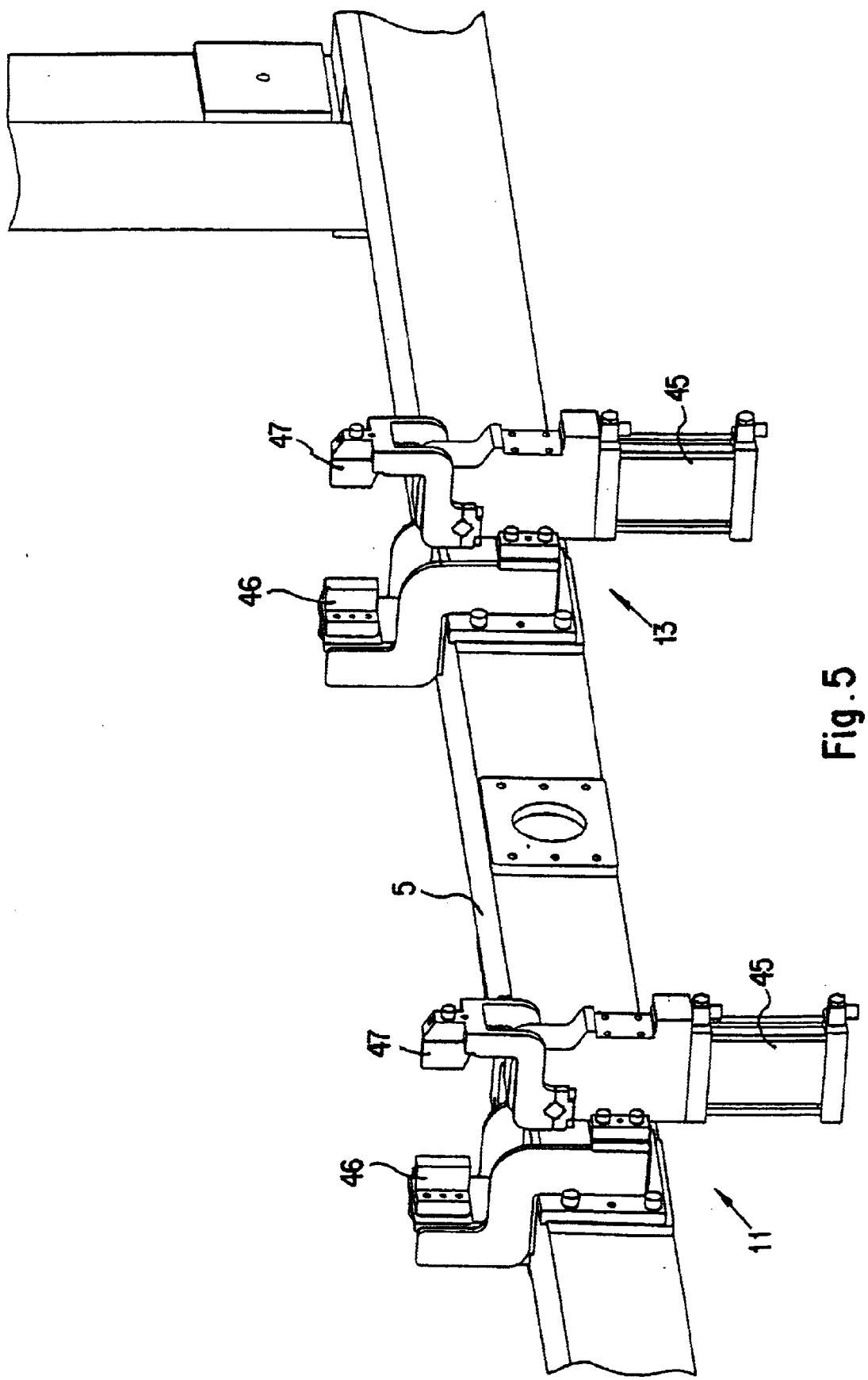
FIG. 5 is a perspective view of the clamping devices in the area of the car threshold.

In FIG. 5 the two clamping systems 11 and 13 are represented, which are affixed to the assembly frame 5 and with their clamping arms clutch the threshold of the car body 2 from underneath it. The clamping systems each includes a clamping cylinder 45 of conventional type, and of a fixed jaw 46 and a jaw 47 operated by the clamping cylinder.

Figure 6:
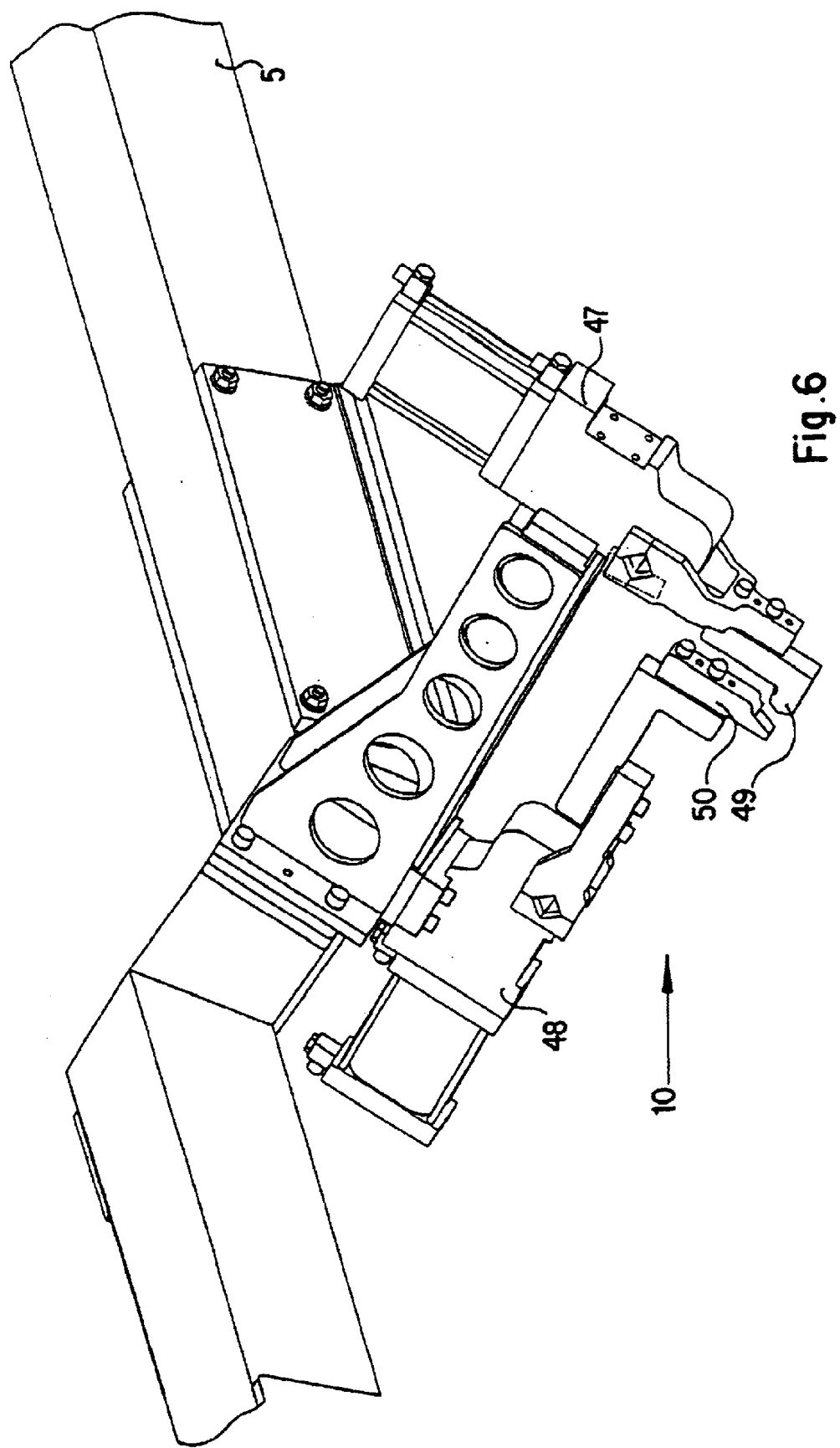
FIG. 6 is a perspective view of the clamping device on the window frame.

FIG. 6 shows the clamping system 10 which includes two jaws 49 and 50 operated by pneumatic cylinders 47 and 48. Both pneumatic cylinders are affixed to the assembly frame 5. The two jaws clutch the A post in the area of the side window opening.

By means of the positioning systems 14 and 15 and the four clamping systems 10–13, the assembly frame is positioned and held accurately in position on the car body 2. The four clamping systems act in the direction of the car's width (Y axis), the two pins 29 and 40 in the direction of the car's height (Z axis) and the fixed pin 29 additionally in the direction of the car's length (X axis).

Figure 7:
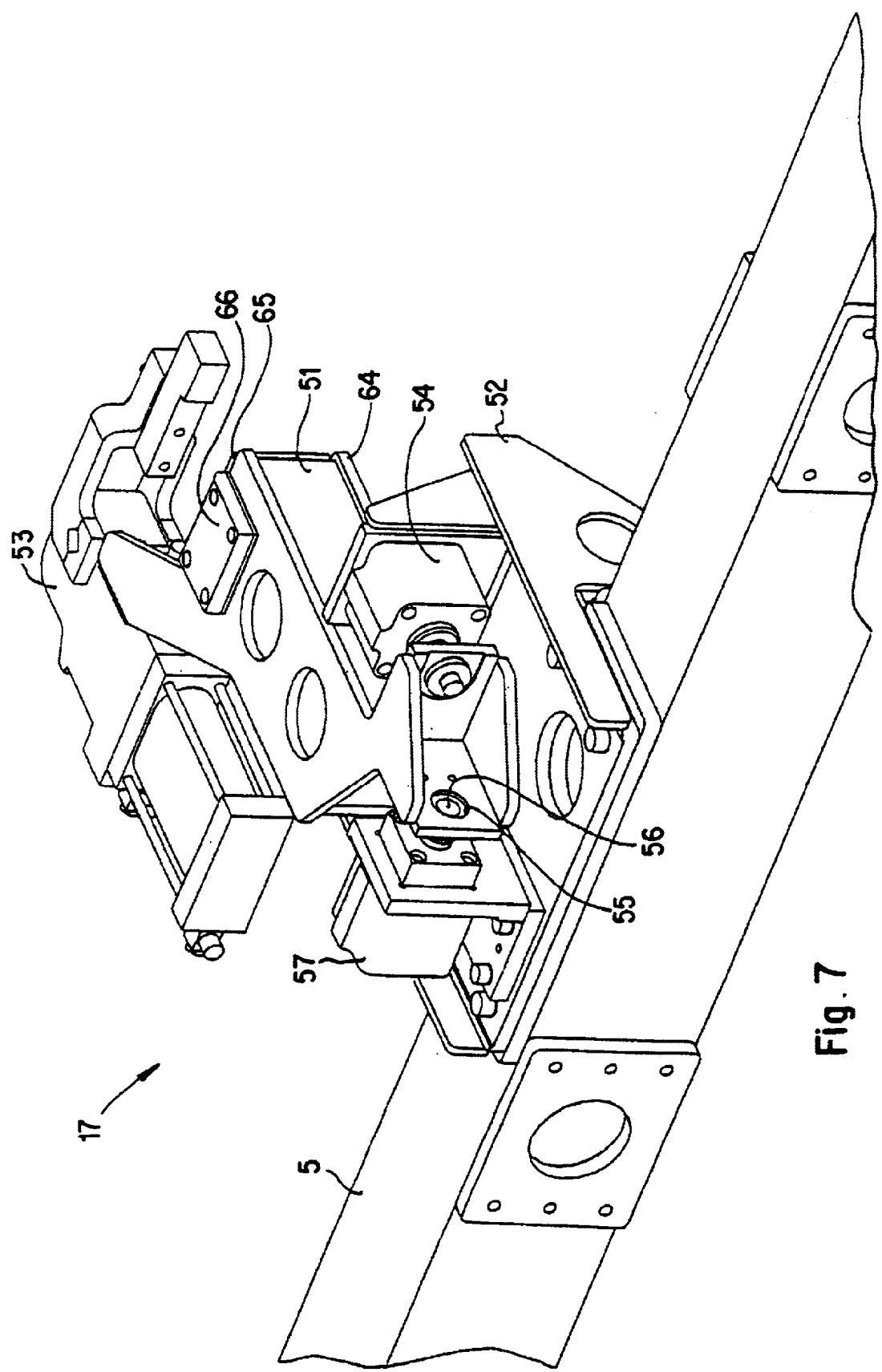
FIG. 7 is a perspective representation of the docking system for the supports of the front and rear car door.

In FIG. 7 the docking point 17 is represented, which includes a carriage 51 which is carried on a bracket 52 which is affixed to the assembly frame 5.

The carriage 51 bears a clamping means 53 of conventional design. In direction Y the carriage is driven by a pneumatic cylinder 54. A centering socket 55 on the carriage 51, into which a centering pin 56 driven by an additional pneumatic cylinder 57 can engage, serves for centering the carriage 51 in direction Y.

Figure 8:
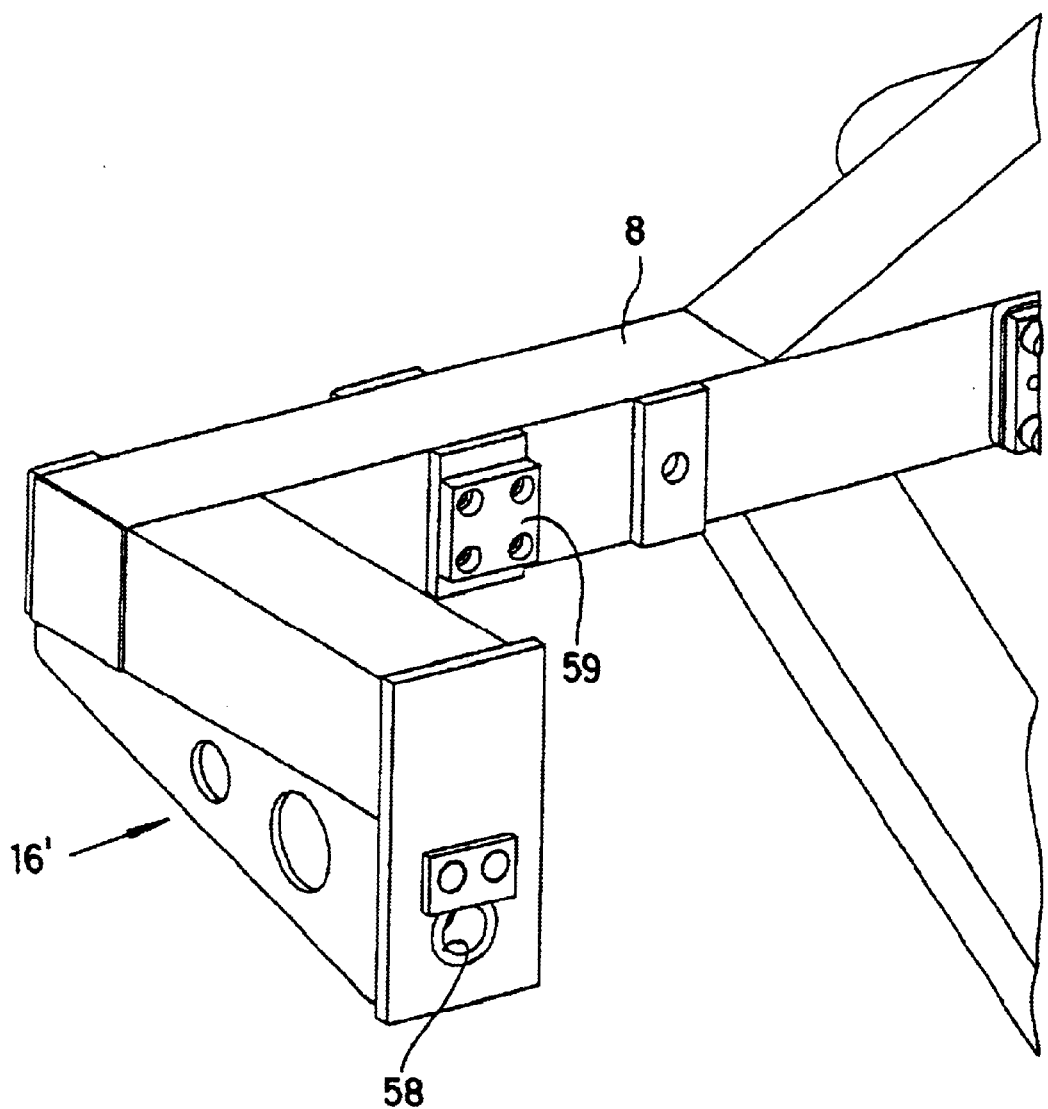
FIGS. 8 and 9 are schematic views of the receiving points on the rear door carriers.
Figure 9:
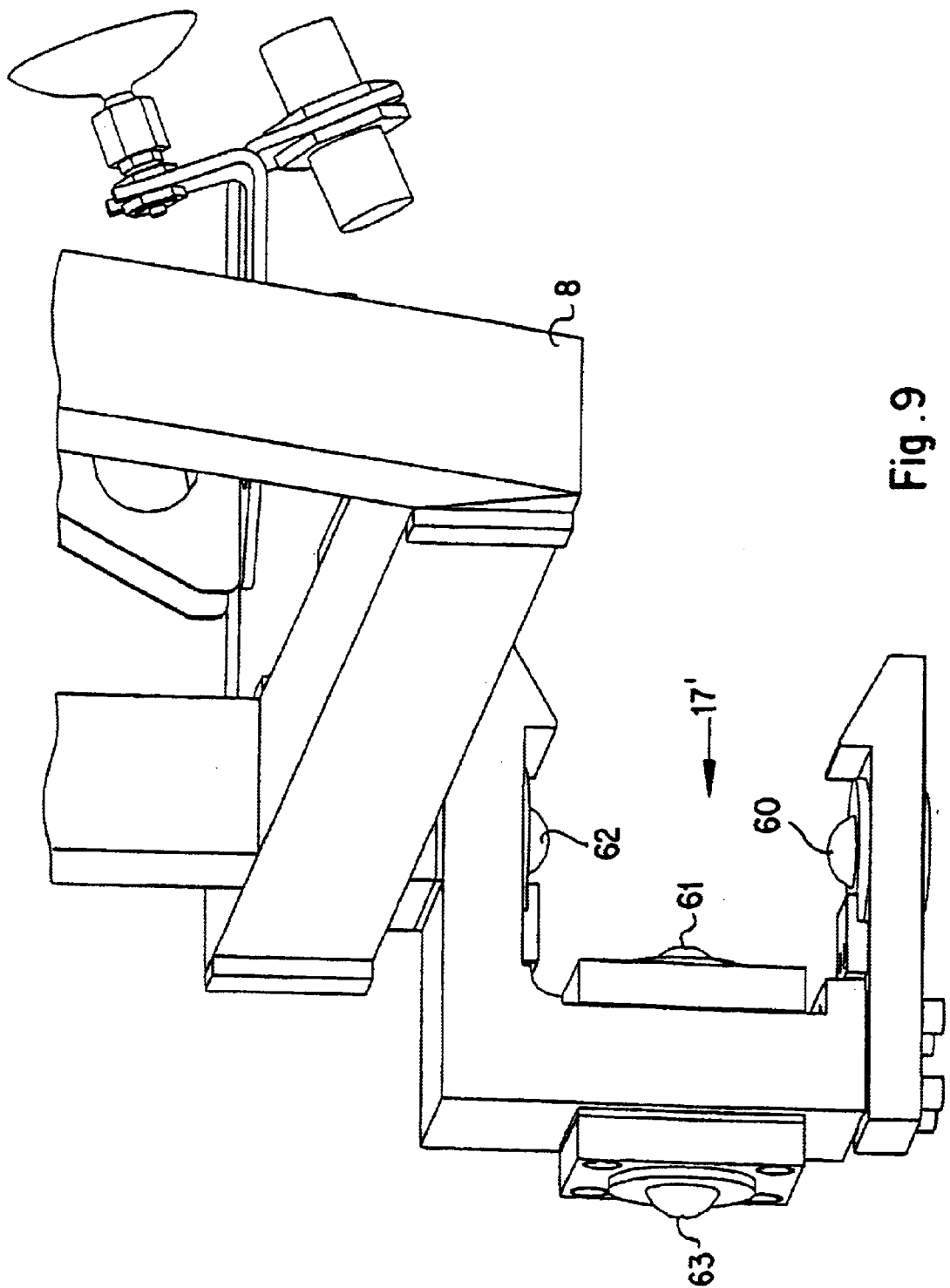
Figure 10:
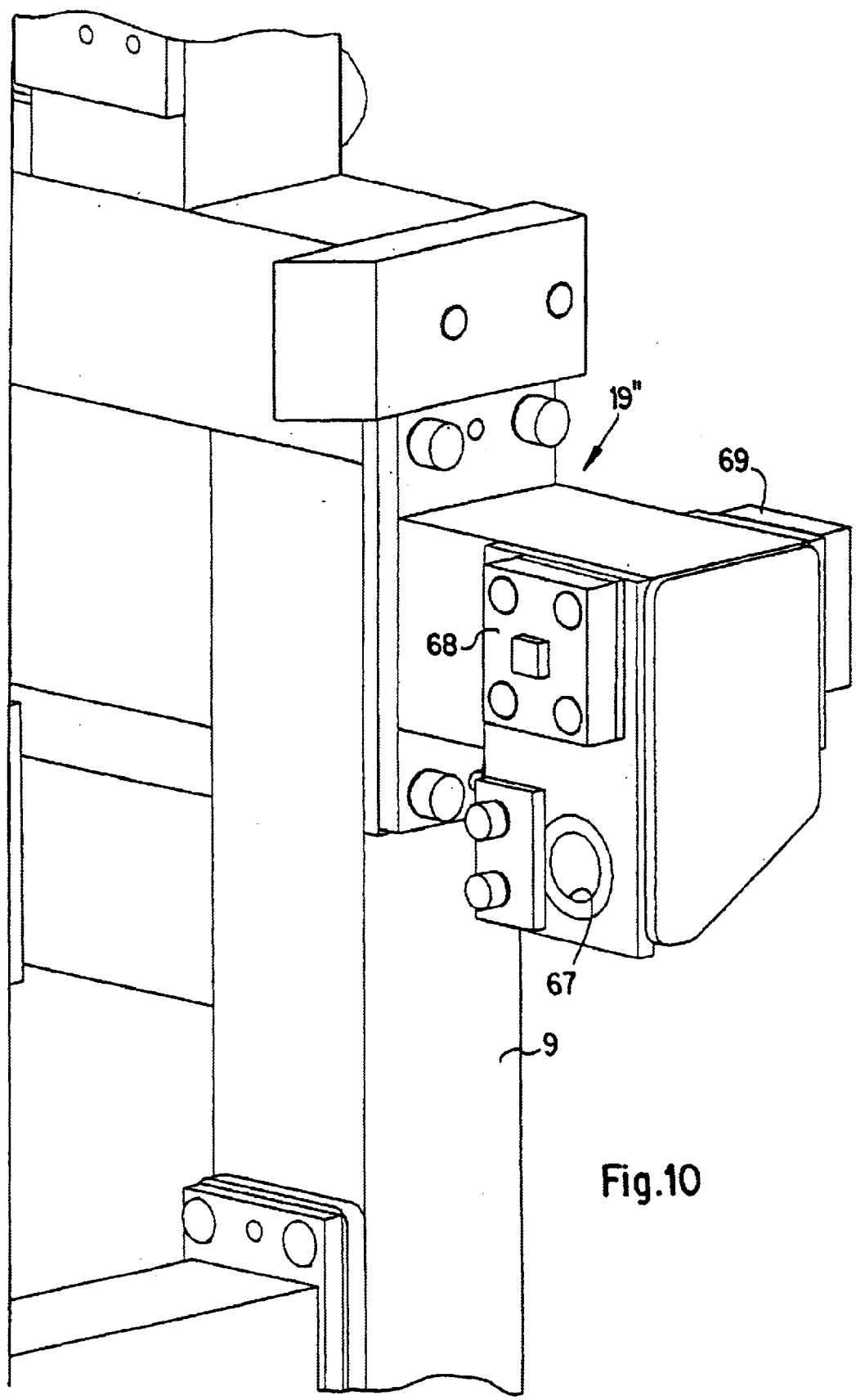
FIG. 10 is a perspective view of a receiving point on the front door carriers.

FIGS. 8 to 10 show the docking points on the support 8 and on the support 9, which cooperate with the docking points 16 to 19 on the assembly frame.

In FIG. 8 is shown the receiver 16' on the support 8. It includes a centering socket 58 which cooperates with the centering pin 44 (FIG. 4) of the length equalizing system 39.

Also shown in FIG. 8 is the receiving surface 59 which cooperates with a clamping system, not shown in FIG. 4, in the docking point 16.

FIG. 9 shows the contact points 60 to 63 of the receiver 17' which cooperates with the docking point 17. The contact points 60, 61 and 62 are each disposed on one limb of a U, and engage correspondingly disposed counter-surfaces 64 to 66 on carriage 51 (FIG. 7) of docking point 17.

The clamping system 53 from FIG. 7 acts with its movable clamp jaw on the contact point 63. This assures the setting in directions Z and Y.

To prevent tilting and jamming when the contact points 60 and 62 engage the counter-surfaces 64 and 66, the contact points 60 and 62 are equipped with rotatably mounted balls, so that only point contacts are made with the corresponding counter-surfaces. The two contact points 61 and 63 have the same arrangement of balls.

The docking point 18 is identical in construction to docking point 17 and therefore is not further explained. The holders 18' have no fixation in the direction of the car's height, so the corresponding contact points 60 and 62 are lacking.

It is again true that three docking points fix the support 8 in the direction of the width (Y axis), namely the contact surfaces 59 and 61, and the corresponding contact surface of docking point 18, that two docking points fix the support 8 in the direction of the height (z axis), namely contact points 60 and 62 and the centering socket 58, and that one docking point fixes the support 8 in the lengthwise direction, namely the centering socket 58.

FIG. 10 shows the holder 19" on the support 9, which cooperates with docking point 19 (FIGS. 1 and 3).

The holder 19" includes a centering socket 67 which cooperates with the centering pin 30 of FIG. 3. Also, two contact surfaces 68 and 69 are present on the holder 19" and cooperate with the clamping system 30 of FIG. 3.

Here again three docking points set the support 9 in the direction of the car's width, two in the car's in the direction of its height, and one docking point sets the support 9 in the direction of its length.

A complete assembly operation for a left rear and left front door will now be explained with the aid of the drawings. For the use of the configuration of the installation system according to the invention described in the drawings it is required that a reference opening be present in the area of the A and C posts. Usually this reference opening is produced in the side wall when the side wall is stamped.

It is also required that the door hinges are screwed on the door side and car side on the A and B posts, and that their mounting surfaces on the corresponding door are perpendicular to one another when the door is closed. The doors are delivered with door hinges screwed and aligned in the proper position.

The starting point of the door mounting process is a car body positioned relative to the frame 1, which is roughly aligned with the two assembly frames 5. Both assembly frames 5 are disposed in their starting position at a distance from the car body.

Outside of the assembly frame 5 are the two supports 8 and 9, each with a corresponding door.

As soon as the car body is in position the C-shaped bracket 4 is moved towards its side wall. This movement is halted by a mechanical abutment, not shown, in the carrier unit 3. In this approaching movement of the C-shaped bracket 4 to the side wall, the pins 29 and 40 enter into the corresponding reference openings in the side wall. Since pin 29 is affixed to the assembly frame 5, the assembly frame 5 becomes fixed in directions X and Z by entering the reference opening in assembly frame 5.

A difference in length in direction X between the two reference opening(s) is compensated by pin 40 by the fact that it is movable in direction X on the carriage 41. Thus, the pin 40 fixes the rear part of the assembly frame only in direction Z.

Due to the movable setting of the assembly frame 5 on the C-shaped bracket 4, the assembly frame 5 can also be aligned by means of the pins 29 and 40 in directions X and Z in relation to the C-shaped bracket 4. The movable mounting of the assembly frame 5 is achieved by the mounting shown in FIG. 2, since it allows movement of the assembly frame in all directions. This is possible due to the air cushion in cylinder 20 on which the assembly frame "floats."

Then the clamping systems 10 to 13 close, so that the assembly frame 5 is affixed to the side frame of the car body. This assures that the assembly frame 5 is precisely aligned with the side wall of the car body, so that the doors now to be installed can be aligned through this assembly frame according to the position of the side frame.

Before the actual mounting of the doors begins, and after the clamping systems 10 to 13 are tightened, the feeler 43 of the length equalization system is moved from its former waiting position downward in direction X until it makes contact with the side frame. On account of the ratio of movement this travel is not transferred in a 1:1 ratio to the centering pin 44, but in a ratio of 2:1, for example, i.e., only half of the travel of the feeler 43 is applied to the length of travel of the centering pin 44.

This length equalization system is intended to assure that the vertical seam of the rear door is equal in size to the C post and to the edge of the front door, even if the rear door opening differs from the prescribed size.

This length equalization system is helpful. Of course, the rear door can also be fitted by hand in the X direction after the doors are mounted. In this case the centering pin 44 is then affixed to the assembly frame 5.

After the centering pin 44 has been aligned the support 8 is moved by a worker or an industrial robot toward the assembly frame 5, such that the corresponding docking points of the assembly frame 5 and support 8 come in contact. For this purpose, of course, the docking points 16 to 18 are opened so that the support 8 aligned in space can be brought in direction Y to the assembly frame 5.

By the entry of the centering pin 44 into the socket 58 of holder 16' the support 8 and with it the rear door is fixed in directions X and Z. The front lower end of support 8 is fixed in directions Y and Z by the holder 17' and the contact points 60 to 62 that are present there to the docking point 17 at the counter-surfaces 64 to 66.

At the holder 18 and 18' a lock in direction Y is achieved, since here only one single clamping device is provided.

As soon as the corresponding clamps in the docking points 16 to 18 are closed, the support 8 is joined tension-free to the assembly frame 5 and held tightly.

Then the tightly held support 8 is driven by the carriage 51 and the pneumatic cylinders 54 in the direction Y from the docking points 17 and 18 until the hinges engage the matching surfaces on the B post. Then the hinges are screwed to the B post. The door is thereby fixed in directions X and Z.

In an additional procedure, the screws on the door side are loosened. The carriages 51 of docking points 17 and 18 are run to the correct position in direction Y by the engagement of the centering pins 56 in the centering sockets 55. For this purpose the centering pins 56 have sufficiently great chamfers so that the carriages are moved as the centering pins enter them. The same thing happens at the upper docking point 18.

The door is thus brought to the correct position in direction Y, so that the door-side hinge leaves can be retightened. Thus the rear door is fitted accurately in the corresponding door opening in the side wall, while at the same time it has been assured that the vertical gap on the C post matches in width the gap of the front door that has not yet been mounted, and that inaccuracies in the processes in the side frame and in the door are equalized in all directions.

To mount the front door, first the support 8 must be released from the assembly frame 5 by releasing the clamps of the docking points 16–18. This is necessary because docking points 17 and 18 are also used for support 9.

As soon as support 8 has reached its waiting position, the support 9 is brought into contact with docking points 17, 18 and 19. The clamping devices of docking points 17 and 18 have been left in their aligned position from the process of screwing on the rear door. The holder 17" is configured like holder 17' and holder 18" like holder 18'.

After support 9 with its holders has been brought up to the corresponding docking points on the assembly frame 5 the corresponding clamps are closed again.

Figure 11:
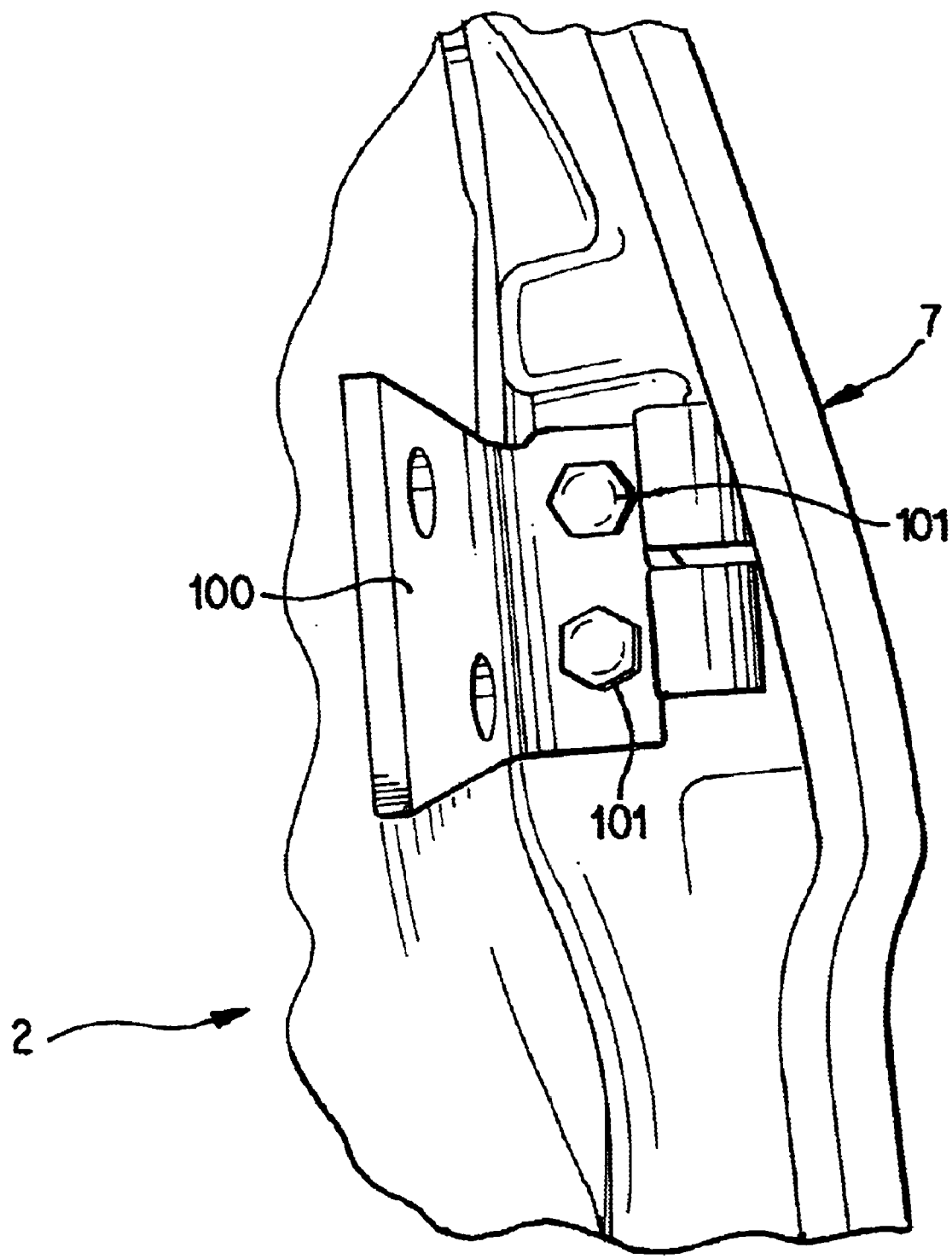
FIG. 11 is a perspective view of the hinge before mounting.

Then the carriage 32 is driven in direction Y by the driving means 33 until the hinges 100 of the front door 7 engage the matching contact surfaces on the A post as in FIG. 11.

As soon as the hinges 100 are against the A post they are screwed on. Thus the front door is aligned firmly with the body in directions X and Z as in FIG. 12. When the screws 101 on the door side are then loosened and the centering pin enters the centering socket 34 the door is aligned in direction Y. After the centering pin has entered the centering socket 34 the screws on the door side are retightened.

Due to the fact that the clamps of docking points 17 and 18 are tight in their position and these docking points are also used for adjusting the rear edge of the front door, the front door is flush with the rear door, so that no offset exists.

After the clamps of docking points 17, 18 and 19 are released the support 9 can again be removed from the assembly frame 5 and brought to the waiting position.

Then the clamps 10 to 13 are released, so that the assembly frame 5 can move out and away from the side wall.

On the right side of the vehicle the same procedure has been performed for the right front and right rear door, so that the car body now equipped with doors can be moved out of the frame 1 to the next work station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for installing on a motor vehicle body, a motor vehicle door which is fastened by screw mounting via screw-mountable hinges having mounting surfaces running substantially perpendicular to one another when the vehicle door is closed, comprising:
    position aligning the vehicle door with the hinges screwed on in a direction of two vehicle axes in a corresponding door opening,
    screwing the hinges of the vehicle door onto mounting surfaces on a body side,
    loosening the screw mounting on door side,
    aligning the vehicle door in a direction of a third vehicle axis, and
    retightening the screw mounting on the door side.

2. Method according to claim 1, wherein, in the case of a four-door car body, first rear doors and only then front doors are screwed on.

3. Method according to claim 2, wherein an assembly frame is positioned on a side wall of the vehicle body and coupled thereto, each said vehicle door is held by a corresponding support, and the assembly frame has adjustable holders for the supports, while front holders, as seen lengthwise of the vehicle body, are used simultaneously as rear holders for the support of the front vehicle door.

4. A method according to claim 1, wherein the vehicle body is a four-door vehicle body and the vehicle door is a rear vehicle door, and the installing includes the additional steps of:
    providing a front vehicle door with the hinges previously fastened to the front vehicle door with screw mountings,
    position aligning the front door in directions of the two vehicle axes in a corresponding front door opening,
    fastening the front door hinges onto the corresponding mounting surfaces on the vehicle body,
    loosening the screw mounting on the front door side,
    aligning the front door in a direction of a third vehicle axis, and
    retightening the screw mounting on the front door side,
    wherein the rear door is installed and only then the front door is installed.

5. A method according to claim 4, wherein
    an assembly frame is positioned on a side wall of the vehicle body and coupled thereto,
    the front and rear doors are held by front and rear supports,
    the assembly frame has adjustable holders for the supports whereby the adjustable holders for a front section of the rear support are the adjustable holders for a rear section of the front support.

6. A method according to claim 5, wherein the adjustable holders for the front of the rear support are not repositioned on the assembly frame when the front door is installed.

7. Apparatus for installing a door on a motor vehicle body, comprising a frame for holding a vehicle door to be mounted, which can be positioned in a corresponding door opening by a support and having hinges screwed into proper position, wherein an assembly frame is provided, which can be positioned and docked by positioning devices and holding devices on a side wall of the vehicle body, and the assembly frame has adjustable holders for positioning the support of the vehicle door.

8. Apparatus according to claim 7, wherein the assembly frame is adjustable and held floatingly in a C-shaped bracket by at least two frame holding devices.

9. Apparatus according to claim 8, wherein the frame holding devices include a cylinder-and-piston unit, the cylinder being fastened for rotation on the C-shaped bracket, and a piston rod being fastened through a ball joint to the assembly frame.

10. Apparatus according to claim 7, wherein one of the positioning devices is provided at a height of each of an A post and a C post, each of the positioning devices including a pin which engages a reference opening in the side wall.

11. Apparatus according to claim 10, wherein the pin of the positioning device for the C post is mounted for displacement lengthwise of the motor vehicle.

12. Apparatus according to claim 7, wherein the assembly frame can be docked by four clamping systems to a side frame of the body.

13. Apparatus according to claim 7, wherein the support for the vehicle door is connectable with the assembly frame by way of three docking points.

14. Apparatus according to claim 13, wherein each of the docking points has a clamping device.

15. Apparatus according to claim 14, wherein the clamping device at the docking point at a height of a B post is provided on a carriage for displacement along the vehicle width.

16. Apparatus according to claim 7, wherein for a rear vehicle door a docking point is provided at a height of a C post and two docking points at a height of a B post, the two docking points at the height of the B post being disposed at the top and bottom of the door opening.

17. Apparatus according to claim 7, wherein, for a front vehicle door, a docking point is provided at a height of an A post and a corresponding clamping device is mounted on a carriage for displacement along the width of the vehicle.

18. An assembly for installing a vehicle door, which has hinges screwed into position, on a vehicle body, comprising:

a frame being positioned relative to the vehicle body, at least one assembly frame which is positionable and operatively fixable on a side wall of the vehicle body via positioning devices and holding devices, operatively connected to the frame, at least one carrier for supporting the vehicle door, and at least one adjustable holder being provided on the assembly frame for positioning the carrier.

19. An assembly according to claim 18, wherein the at least one assembly frame is adjustable and floatingly held in a C-shaped bracket by at east two frame holders.

20. An assembly according to claim 18, wherein the side wall includes at least one reference opening at an A post and at a C post for corresponding pins of the positioning devices.

21. A method of installing a vehicle door with fastener-mounted hinges, comprising:

providing the vehicle door and the fastener-mounted hinges, aligning the vehicle door into a corresponding door opening in a vehicle body in a first axis and a second axis, fastening the fastener-mounted hinges to the vehicle body, aligning the vehicle door in a third axis, and fastening the door to the fastener-mounted hinges, wherein the fastener-mounted hinges are previously fastened to the vehicle door before the vehicle door is provided and are loosened before aligning the vehicle door in the third axis.

22. A method according to claim 21, wherein the fastener-mounted hinges are screw-mountable or bolt-mountable hinges.

23. A method according to claim 21, wherein the fastener-mounted hinges are previously fastened to the vehicle door before the vehicle door is provided and are loosened before aligning the vehicle door in the third axis.

* * * * *

UNITED STATES PATENT AND TRADEMARK OFFICE
CERTIFICATE OF CORRECTION

PATENT NO.     : 6,643,905 B1
DATED          : November 11, 2003
INVENTOR(S)    : Scott Rhoads et al.

It is certified that error appears in the above-identified patent and that said Letters Patent is hereby corrected as shown below:

<u>Title page,</u>
Insert:
-- [30]         Foreign Application Priority Data
Jan. 23, 1999           [DE]    Germany...................199 02 635.1 --

Signed and Sealed this

Twentieth Day of January, 2004

JON W. DUDAS
*Acting Director of the United States Patent and Trademark Office*